Patented Sept. 13, 1949

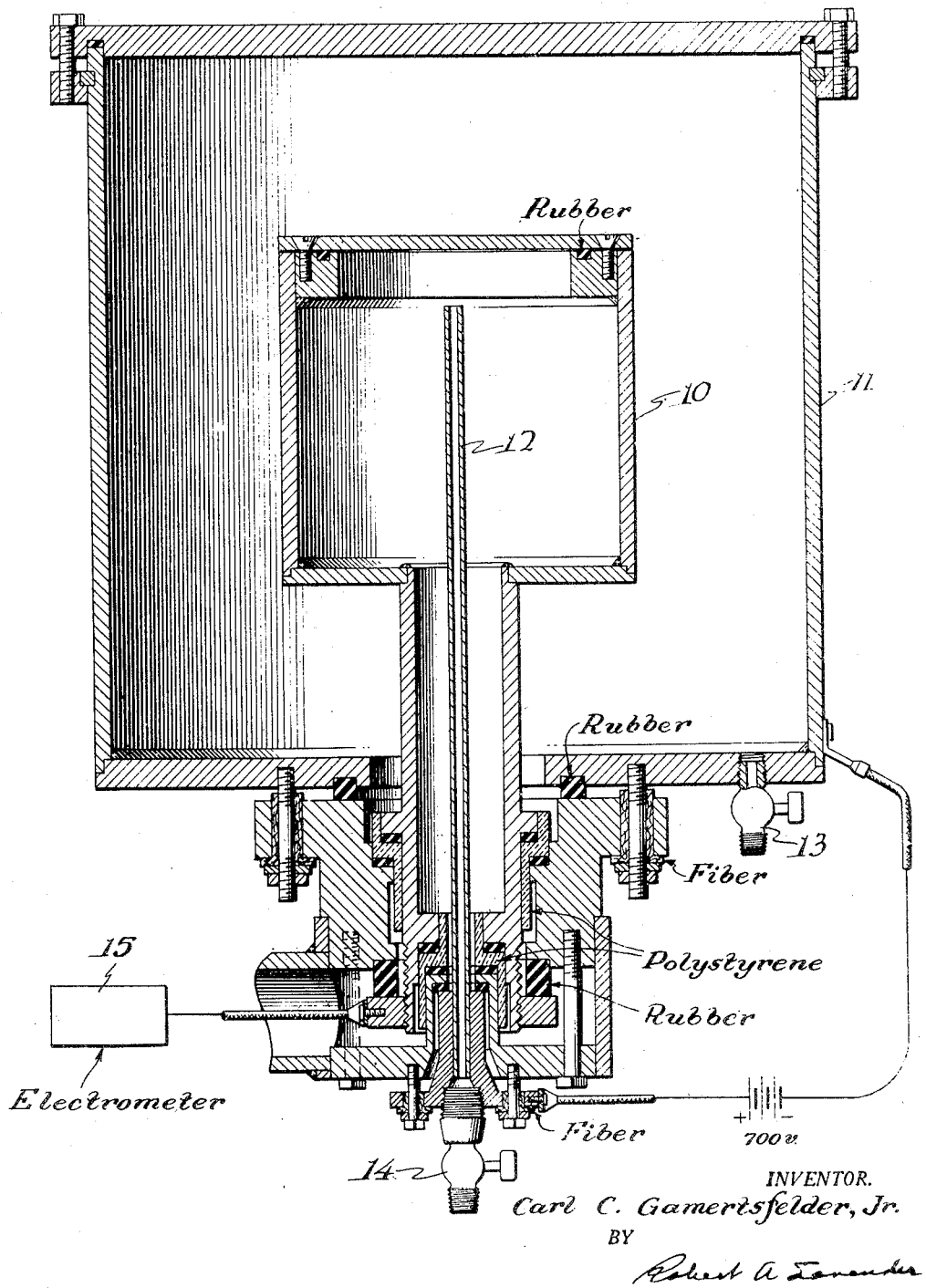

2,481,506

UNITED STATES PATENT OFFICE 2,481,506

FAST NEUTRON METER

Carl C. Gamertsfelder, Jr., Oak Ridge, Tenn., assignor to the United States of America as represented by the United States Atomic Energy Commission Application July 6, 1944, Serial No. 543,701

4 Claims. (Cl. 250—83.6)

This invention relates to the measurement of radioactivity and particularly to a process and apparatus for ascertaining the intensity of neutron radiation in the presence of gamma radiation.

Neutron radiation is frequently accompanied by other radiations which complicate the separate measurement of the neutrons. Alpha and beta particles are much less penetrating than neutrons and are easily absorbed so that they present no problem. Gamma rays are, however, very penetrating and are difficult to exclude from the measurement of neutrons. It is an object of this invention to furnish a method and apparatus whereby gamma ray effects cancel out and the measurement indicated is that resulting from neutrons only.

This object is obtained by causing the gamma radiation to produce equal and opposite effects while the neutrons produce a unidirectional effect the magnitude of which is a measure of the neutron intensity. To accomplish this it is important to remember that the transverse energy distribution of gamma rays is not constant and therefore precautions must be taken to assure that the gamma ray effects are in fact equal as well as opposite.

The invention will be readily understood from the following description when read in connection with the accompanying drawing the single figure of which shows in section one suitable arrangement for practicing the invention.

In accordance with the invention and as shown in the drawing, an inner casing 10 and an outer casing 11 provide two chambers arranged concentrically about a central electrode 12. The outer chamber comprising the space enclosed by the casings 10 and 11 is filled through a suitable valve 13 with a suitable gas such as methane or ethylene under pressure which will be ionized by neutrons via proton recoil. The inner chamber enclosed by the casing 10 is filled with a gas under pressure in which the proton recoil due to neutron bombardment is very small, the preferred gas being argon. The electrode 12 is made in tubular form and provided with a suitable valve 14 to furnish access to the inner chamber. The pressures of the respective gases in the two chambers are adjusted so that the ionization produced by gamma radiation will be the same in both chambers. Thus when a voltage is impressed across the electrode 12 and the outer casing 11, the inner casing 10 becomes a collecting electrode having collecting fields of opposite sign and the equal ionization current produced in both chambers will cancel out insofar as the collecting electrode is concerned.

In practice, the differential balance of the two chambers is obtained by filling the outer chamber with methane at the desired pressure, exposing to high energy gamma radiation and adjusting the pressure of the argon in the inner chamber until the collecting electrode 10 has a net charge of zero. The charges on the collecting electrode 10 may be determined in the usual manner by connecting it to an electrometer 15. In accordance with conventional usage the electrode connected to the electrometer is the collecting electrode.

When the two chambers encompass equal volumes it has been found that with the methane at a pressure of sixty pounds, the pressure of the argon necessary to give zero reading for gamma radiation is in the neighborhood of forty pounds. The chamber containing the methane may, if desired, be lined with paraffin in which case it should be coated to render it conducting, as with aquadag.

It will be evident that when the apparatus above described is subjected to mixed gamma and neutrons, the electrometer will measure the difference in ionization in the two chambers, and this difference is necessarily a measure of neutron intensity since the ionization due to gamma is equal in the two chambers. Furthermore, the equality of the ionization in the two chambers due to gamma radiation is assured by virtue of the symmetrical and mutually concentric arrangement of the two chambers.

It is to be understood that the casings 10 and 11 and the electrode 12 are individually isolated electrically, but inasmuch as the particular assembly structure forms no part of the invention, it is believed that the drawing shows the structure sufficiently to enable anyone skilled in the art to make the twin ionization chamber of the invention.

It is apparent that many modifications of the invention will occur to those skilled in the art without departing from the scope of the invention as set forth in the appended claims.

I claim:

1. Apparatus for measuring neutron intensity in the presence of gamma radiation comprising a rod electrode, two chambers arranged concentrically with respect to each other and about said rod electrode, both of said chambers being equally responsive to gamma radiation and one only of said chambers being responsive to neutron bombardment.

2. The method of measuring neutron intensity in the presence of gamma radiation which comprises producing a first ionization current corresponding to the sum of the intensities of the neutron radiation and the gamma radiation to which a first region is subjected, producing a second ionization current corresponding to the intensity of the gamma radiation to which a second region is subjected, said first and second regions being mutually concentric with respect to each other, reducing the first ionization current by an amount equal to the second ionization current, and noting the magnitude of the resulting current.

3. Means for measuring fast neutrons in the presence of high energy gamma radiation comprising a rod electrode, an inner chamber and an outer chamber arranged mutually concentric and mounted symmetrically with respect to the rod electrode, said outer chamber containing a gas capable of being ionized by proton recoil when subjected to fast neutrons and said inner chamber containing a gas in which substantially no ionization occurs when subjected to fast neutrons, whereby when collecting fields of opposite signs are provided for the two chambers ionization caused by gamma radiation cancels out and the net ionization is a measure of neutron intensity.

4. A differential twin chamber device for measuring fast neutrons in the presence of strong gamma radiation comprising a gas tight metal chamber, a metal tube extending into and electrically insulated from said metal chamber, a metal casing spaced and electrically insulated from and surrounding said metal chamber in gas tight relation, and an opening through said metal casing, whereby said metal chamber may be evacuated and filled with a gas through said metal tube and the space defined by said metal chamber and said metal casing may be evacuated and filled with a different gas through said opening.

CARL C. GAMERTSFELDER, Jr.

REFERENCES CITED

The following references are of record in the file of this patent:

UNITED STATES PATENTS

| Number | Name | Date |
|---|---|---|
| 2,288,718 | Kallmann | July 7, 1942 |
| 2,345,119 | Hare | Mar. 28, 1944 |
| 2,349,753 | Pontecorvo | May 23, 1944 |